United States Patent
Yoshida

(10) Patent No.: US 9,740,445 B2
(45) Date of Patent: Aug. 22, 2017

(54) INFORMATION PROCESSING SYSTEM

(71) Applicant: KYOCERA DOCUMENT SOLUTIONS INC., Osaka (JP)

(72) Inventor: Naoki Yoshida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/231,049

(22) Filed: Aug. 8, 2016

(65) Prior Publication Data
US 2017/0090836 A1 Mar. 30, 2017

(30) Foreign Application Priority Data
Sep. 28, 2015 (JP) .................................. 2015-189177

(51) Int. Cl.
*G06F 3/12* (2006.01)
*H04N 1/00* (2006.01)
*G06K 15/00* (2006.01)

(52) U.S. Cl.
CPC .......... *G06F 3/1258* (2013.01); *G06F 3/1205* (2013.01); *G06F 3/1292* (2013.01); *H04N 1/00204* (2013.01); *H04N 2201/006* (2013.01); *H04N 2201/0094* (2013.01); *H04N 2201/3253* (2013.01)

(58) Field of Classification Search
CPC .... G06F 3/1205; G06F 3/1258; G06F 3/1292; H04N 1/00204; H04N 1/00217; H04N 1/00307; H04N 1/33323; H04N 1/33369; H04N 2201/006; H04N 2201/0027; H04N 2201/0039; H04N 2201/0041; H04N 2201/0044; H04N 2201/0094; H04N 2201/3253
USPC .......... 358/1.1–1.18, 402, 448; 709/221, 223
See application file for complete search history.

(56) References Cited

U.S. PATENT DOCUMENTS

| | | | | |
|---|---|---|---|---|
| 9,164,711 B2 * | 10/2015 | Mori | ...................... | G06F 3/1206 |
| 2003/0119529 A1 * | 6/2003 | Hirokawa | .............. | G01C 21/20 |
| | | | | 455/456.1 |
| 2009/0022091 A1 * | 1/2009 | Buer | .................... | H04L 12/5691 |
| | | | | 370/328 |

(Continued)

FOREIGN PATENT DOCUMENTS

| | | |
|---|---|---|
| JP | 2012-029164 A | 2/2012 |
| JP | 2012-090077 A | 5/2012 |

(Continued)

*Primary Examiner* — Gabriel Garcia
(74) *Attorney, Agent, or Firm* — Li & Cai Intellectual Property (USA) Office

(57) ABSTRACT

An electronic apparatus includes a memory that stores an information processing program and a processor that executes the information processing program. When the processor executes the information processing program, the processor acquires setting information generated by one or more terminal apparatuses with respect to the electronic apparatus, periodically acquires position information of the one or more terminal apparatuses with respect to the electronic apparatus, determines a terminal apparatus closest to the electronic apparatus out of the one or more terminal apparatuses, and sets, in the electronic apparatus, the setting information acquired from the terminal apparatus closest to the electronic apparatus.

8 Claims, 8 Drawing Sheets

(56) References Cited

U.S. PATENT DOCUMENTS

| | | | |
|---|---|---|---|
| 2011/0261405 A1* | 10/2011 | Ito | G06F 1/3203 358/1.15 |
| 2013/0229684 A1* | 9/2013 | Yasuzaki | H04N 1/00127 358/1.15 |
| 2015/0002872 A1* | 1/2015 | Naruse | H04N 1/00217 358/1.13 |

FOREIGN PATENT DOCUMENTS

| | | |
|---|---|---|
| JP | 2014-157482 A | 8/2014 |
| JP | 2015-030145 A | 2/2015 |

\* cited by examiner

| Distance information | Terminal information | Print setting information | |
|---|---|---|---|
| 0.5 [m] | XXXXXX | Monochrome/A4/1 copy | ∼ User setting information |
| 1.0 [m] | YYYYYY | Color/A4/2 copies | ∼ User setting information |
| 1.5 [m] | ZZZZZZ | Monochrome/A5/1 copy | ∼ User setting information |

Print standby list

→ Closer to MFP

FIG.8

INFORMATION PROCESSING SYSTEM

INCORPORATION BY REFERENCE

This application claims the benefit of Japanese Priority Patent Application JP 2015-189177 filed Sep. 28, 2015, the entire contents of which are incorporated herein by reference.

FIELD

The present disclosure relates to an electronic apparatus that executes functions based on setting information generated by a terminal apparatus, a non-transitory computer readable recording medium onto which an information processing program of the electronic apparatus is recorded, and an information processing system including the electronic apparatus and one or more terminal apparatuses.

BACKGROUND

There is known a technique in which a terminal apparatus generates setting information with respect to an electronic apparatus and the electronic apparatus executes functions based on the setting information.

Particularly when an electronic apparatus executes functions based on setting information generated by a plurality of terminal apparatuses, it is favorable for the electronic apparatus to be user-friendly for each of a plurality of users having the plurality of terminal apparatuses.

SUMMARY

An electronic apparatus according to an embodiment of the present disclosure includes a memory that stores an information processing program and a processor that executes the information processing program. When the processor executes the information processing program, the processor acquires, when the information processing program is executed, setting information generated by one or more terminal apparatuses with respect to the electronic apparatus, periodically acquires position information of the one or more terminal apparatuses with respect to the electronic apparatus, determines a terminal apparatus closest to the electronic apparatus out of the one or more terminal apparatuses, and sets, in the electronic apparatus, the setting information acquired from the terminal apparatus closest to the electronic apparatus.

A non-transitory computer readable recording medium according to an embodiment of the present disclosure records an information processing program executable by a computer of an electronic apparatus. The program causes the computer to:

acquire setting information generated by one or more terminal apparatuses with respect to the electronic apparatus;

periodically acquire position information of the one or more terminal apparatuses with respect to the electronic apparatus;

determine a terminal apparatus closest to the electronic apparatus out of the one or more terminal apparatuses;

set, in the electronic apparatus, the setting information acquired from the terminal apparatus closest to the electronic apparatus; and execute a function based on the set setting information.

An information processing system according to an embodiment of the present disclosure includes:

an electronic apparatus including a memory that stores an information processing program, and a processor that executes the information processing program; and one or more terminal apparatuses. When the processor executes the information processing program, the processor acquires, when the information processing program is executed, setting information generated by the one or more terminal apparatuses with respect to the electronic apparatus, periodically acquires position information of the one or more terminal apparatuses with respect to the electronic apparatus, determines a terminal apparatus closest to the electronic apparatus out of the one or more terminal apparatuses, sets, in the electronic apparatus, the setting information acquired from the terminal apparatus closest to the electronic apparatus, and executes a function based on the set setting information.

These and other objects, features and advantages of the present disclosure will become more apparent in light of the following detailed description of best mode embodiments thereof, as illustrated in the accompanying drawings.

BRIEF DESCRIPTION OF FIGURES

FIG. 8 schematically shows a print standby list.

DETAILED DESCRIPTION

Hereinafter, an embodiment of the present disclosure will be described with reference to the drawings. In this embodiment, an image forming apparatus (typically Multifunction Peripheral; hereinafter referred to as MFP) is taken as an example of an electronic apparatus.

1. General Outline of Information Processing System

Figure 1:
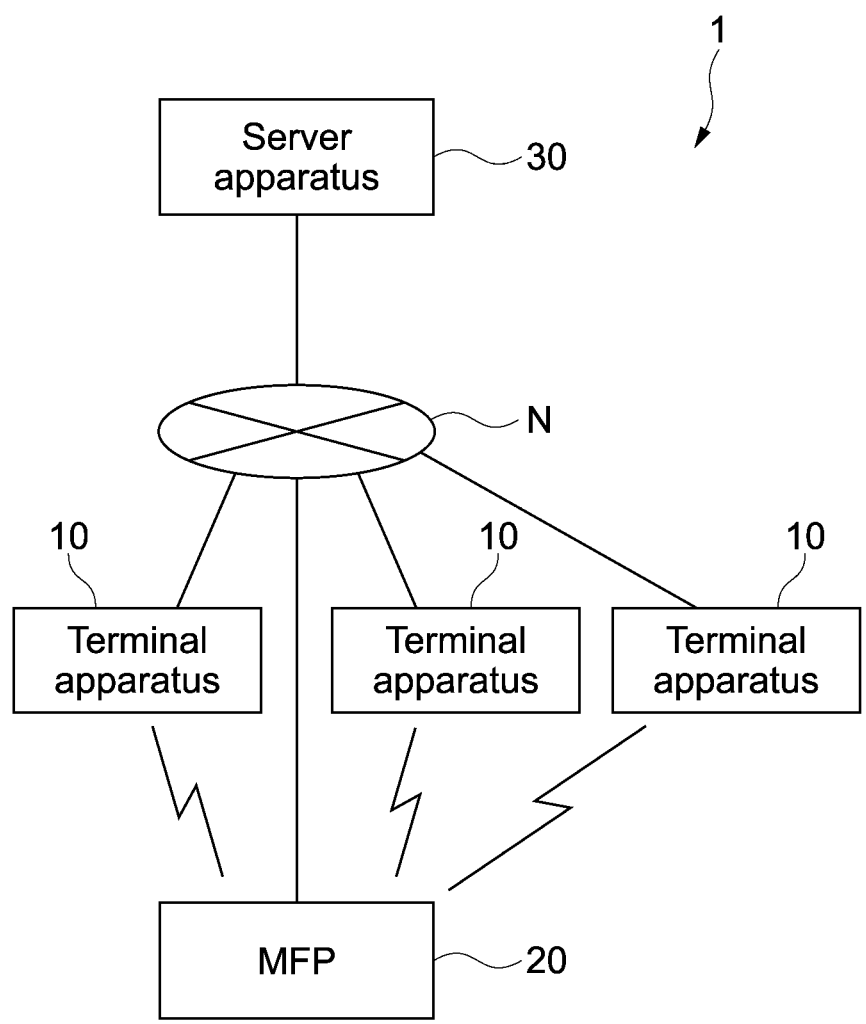
FIG. 1 schematically shows an information processing system according to an embodiment of the present disclosure.

FIG. 1 schematically shows an information processing system according to the embodiment of the present disclosure.

The information processing system 1 includes a plurality of terminal apparatuses 10, an MFP 20, and a server apparatus 30.

The plurality of terminal apparatuses 10 and the MFP 20 are communicable by near field communication using Bluetooth® and the like. The plurality of terminal apparatuses 10, the MFP 20, and the server apparatus 30 are connected to a network N such as the Internet. Typically, the terminal apparatuses 10 are each a mobile terminal such as a smartphone and a tablet-type personal computer.

Typically, when executing a function of printing or the like by the MFP, a user operates a touch panel provided in the MFP to input print setting information (color, paper size, number of copies, magnification, etc.) and then operates a start button to execute the function. When a plurality of users use a single MFP, one user executes the printing function after inputting print setting information, then another user executes the printing function after inputting print setting information, and so on. Therefore, it takes time in not only executing the printing function a plurality of times but also in inputting print setting information for each of the plurality of users. As a result, there may be users who are forced to wait a long time to print.

In view of the circumstances as described above, according to this embodiment, it becomes possible for a plurality of users to generate setting information with respect to one MFP 20 at the same time using the plurality of terminal apparatuses 10. Consequently, when the plurality of users use a single MFP 20, it becomes possible to cut standby times of the users and enhance convenience for the users.

2. Hardware Structure of Terminal Apparatus

Figure 2:
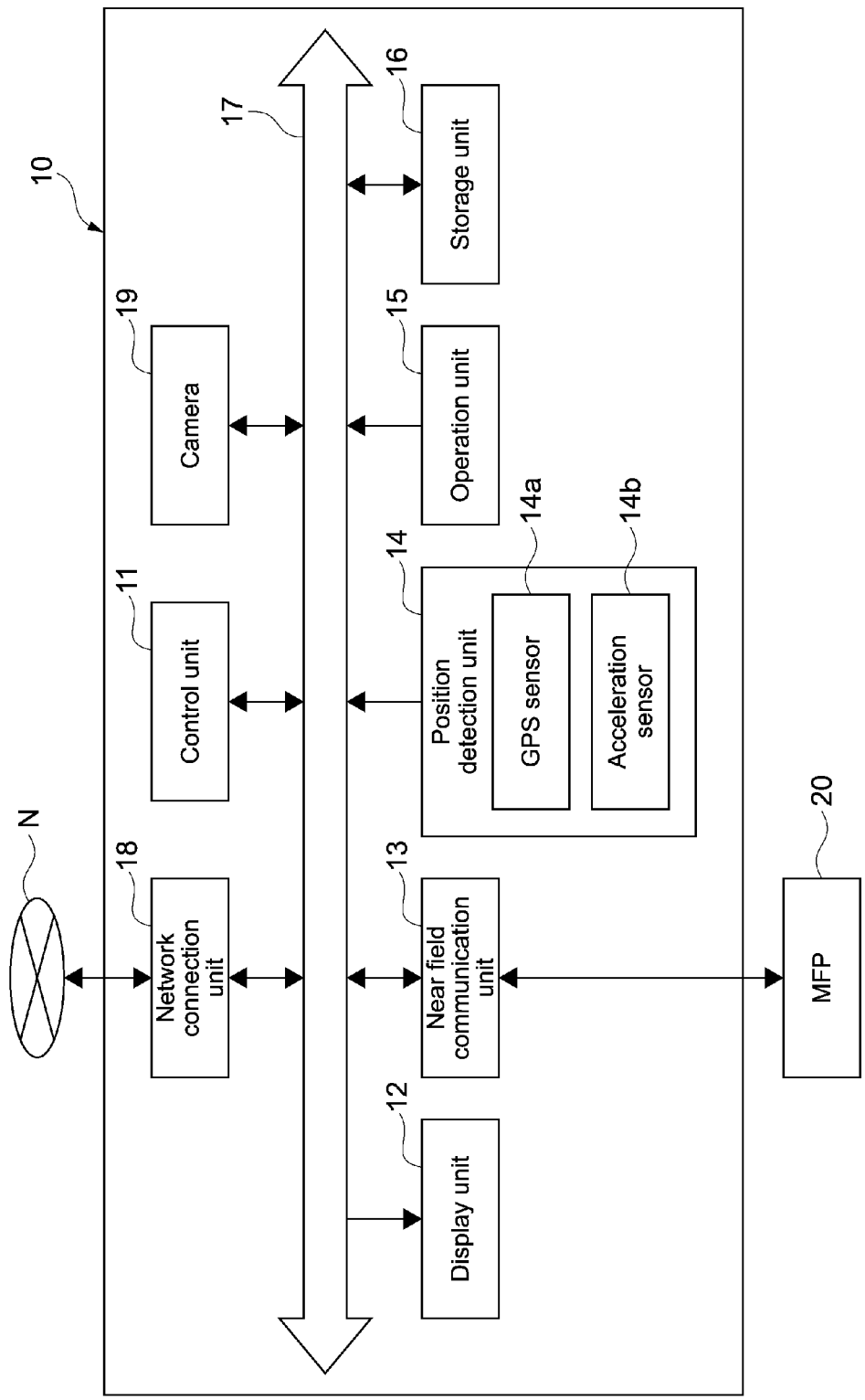
FIG. 2 shows a hardware structure of a terminal apparatus.

FIG. 2 shows a hardware structure of the terminal apparatus.

The terminal apparatus 10 includes a control unit 11 and a display unit 12, a near field communication unit 13, a position detection unit 14, an operation unit 15, a storage unit 16, a network connection unit 18, and a camera 19 that are connected to the control unit 11 via a bus 17.

The control unit 11 includes a CPU (Central Processing Unit) and the like. The control unit 11 executes programs such as an information processing program loaded to a RAM (Random Access Memory).

The storage unit 16 includes semiconductor memories such as a ROM (Read Only Memory) and a RAM. The ROM is a non-transitory computer readable recording medium that fixedly stores programs to be executed by the control unit 11, data, and the like. The programs stored in the ROM are loaded to the RAM.

The display unit 12 includes an LCD (Liquid Crystal Display), an organic EL (Electroluminescence) display, and the like. The display unit 12 carries out operational processing based on information received from the control unit 11 and displays generated image signals on a screen.

The operation unit 15 is a touch sensor superimposed on the display unit 12. The operation unit 15 detects user operations and supplies operation signals to the control unit 11.

The near field communication unit 13 is a communication interface for communicating with the MFP 20 based on a Bluetooth (registered trademark) standard and the like.

The position detection unit 14 includes a GPS (Global Positioning System) sensor 14a, an acceleration sensor 14b, and the like. The position detection unit 14 acquires information for specifying a position or tilt of the terminal apparatus 10 and outputs the acquired information to the control unit 11.

The network connection unit 18 is a communication interface for connecting to the network N.

The camera 19 includes an image pickup device, a lens, and the like and supplies captured data to the control unit 11.

3. Hardware Structure MFP

Figure 3:
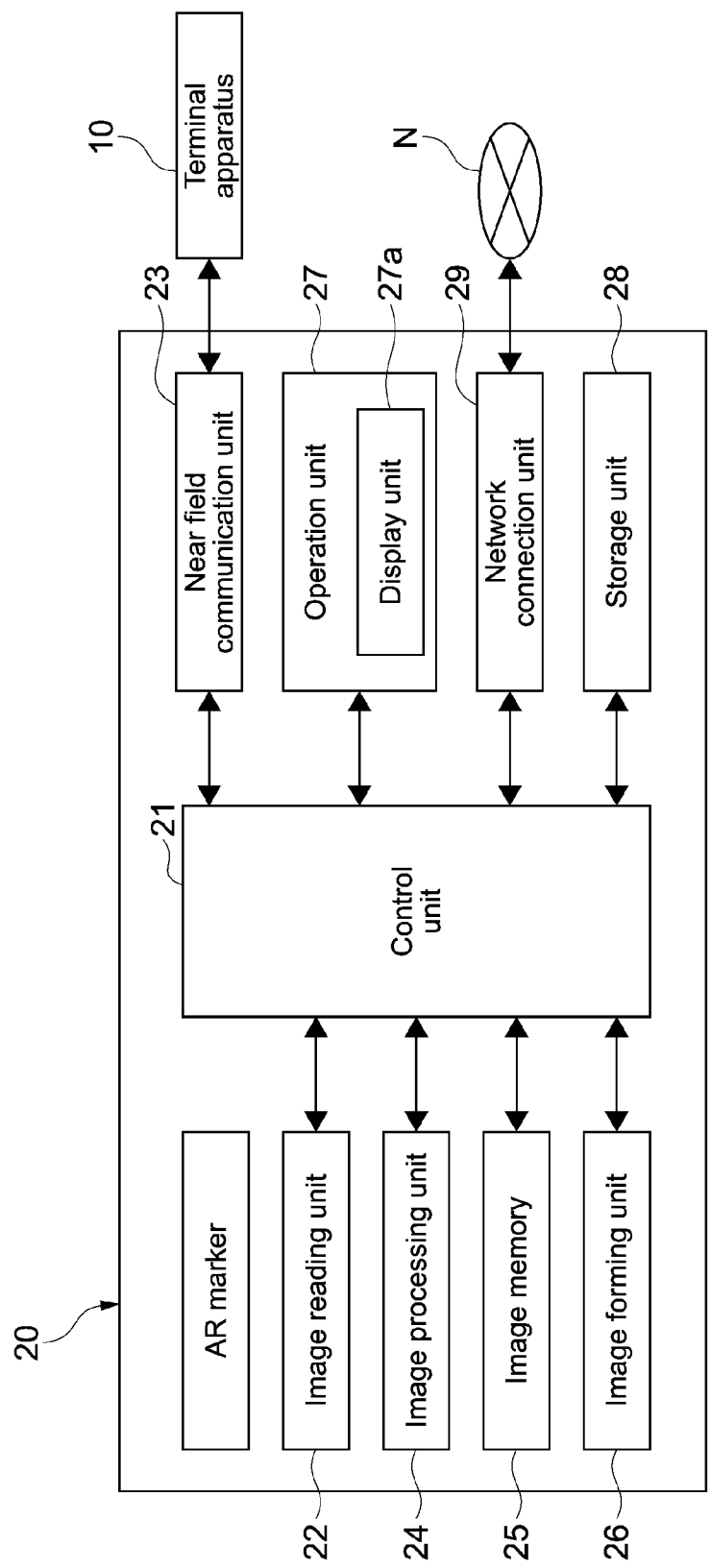
FIG. 3 shows a hardware structure of an MFP.

FIG. 3 shows a hardware structure of the MFP 20.

The MFP 20 includes a control unit 21 and an image reading unit 22, an image processing unit 24, an image memory 25, an image forming unit 26, an operation unit 27, a storage unit 28, a network connection unit 29, and a near field communication unit 23 that are connected to the control unit 21. Attached to the MFP 20 is an AR (Augmented Reality) marker.

The control unit 21 is constituted of a CPU, a RAM, a ROM, a dedicated hardware circuit, and the like and controls overall operations of the MFP 20. A computer program that causes the MFP 20 to function as the respective functional units (to be described later) is stored in a non-transitory computer readable recording medium such as a ROM.

The control unit 21 performs operational control of the respective units connected thereto and exchanges signals and data with those units.

According to job execution instructions input by a user via the operation unit 27 or a personal computer (not shown) connected to the network, the control unit 21 controls drive and processing of mechanisms requisite for executing operational control of functions such as a scanner function, a printing function, and a copy function.

The image reading unit 22 reads an image from a manuscript.

The image processing unit 24 processes image data of the image read by the image reading unit 22 as necessary. For example, the image processing unit 24 carries out image processing such as a shading correction for improving image quality after the image read by the image reading unit 22 is formed.

The image memory 25 is an area for temporarily storing data of a manuscript image read by the image reading unit 22 or data to be printed by the image forming unit 26.

The image forming unit 26 forms an image of the image data read by the image reading unit 22, and the like.

The operation unit 27 includes a touch panel unit and an operation key unit that receive user instructions on various operations and processing executable by the MFP 20. The touch panel unit includes a display unit 27a such as an LCD (Liquid Crystal Display) equipped with a touch panel.

The near field communication unit 23 is a communication interface for communicating with the one or more terminal apparatuses 10 based on a Bluetooth® standard and the like.

The network connection unit 29 is a communication interface for connecting to the network N.

The storage unit 28 is a large-capacity storage apparatus such as an HDD (Hard Disk Drive), that stores manuscript images read by the image reading unit 22 and the like.

4. Hardware Structure of Server Apparatus

The hardware structure of the server apparatus 30 is similar to that of a typical information processing apparatus, so illustrations and descriptions thereof will be omitted. For example, the hardware structure of the server apparatus 30 may be a structure in which the near field communication unit 13 and the camera 19 are removed from the hardware structure of the terminal apparatus 10 (FIG. 2). For example, the server apparatus 30 stores a print setting application and provides the print setting application to the terminal apparatus 10 when requested from the terminal apparatus 10.

5. Functional Structure of Terminal Apparatus

Figure 4:
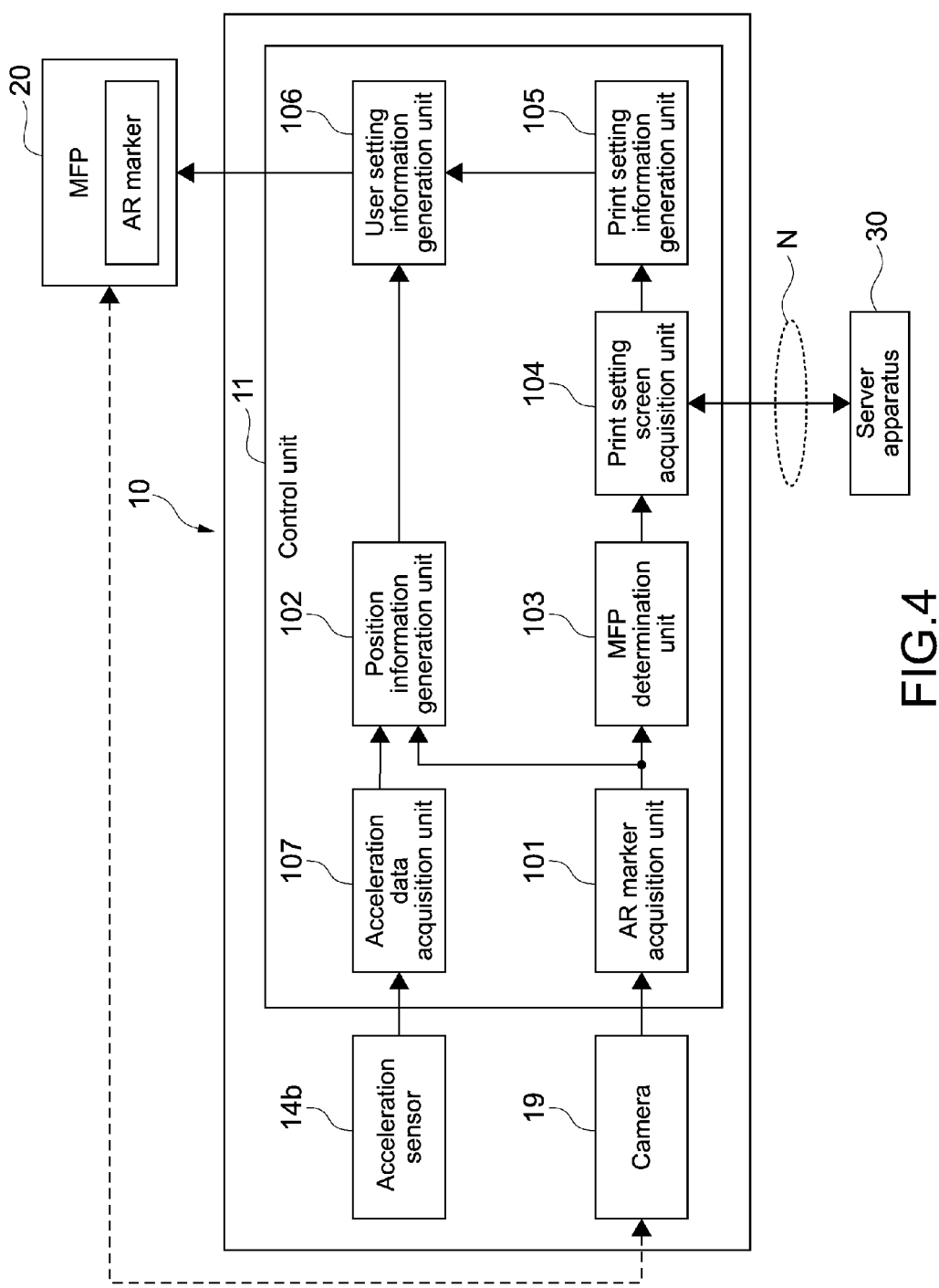
FIG. 4 shows a functional structure of the terminal apparatus.

FIG. 4 shows a functional structure of the terminal apparatus.

The control unit 11 of the terminal apparatus 10 loads the information processing program stored in the ROM as an example of the non-transitory computer readable recording medium in the RAM and executes the information processing program, to thus function as an AR marker acquisition unit 101, an acceleration data acquisition unit 107, a position information generation unit 102, an MFP determination unit 103, a print setting screen acquisition unit 104, a print setting information generation unit 105, and a user setting information generation unit 106.

The AR marker acquisition unit 101 acquires captured data obtained by capturing an AR marker attached to the MFP 20 to be used by the camera 19.

The acceleration data acquisition unit 107 periodically acquires acceleration data of the terminal apparatus 10 that has been detected by the acceleration sensor 14b.

Based on the size of the AR marker included in the captured data, the position information generation unit 102 calculates a distance between the terminal apparatus 10 and the MFP 20 and generates distance information (position information) indicating the calculated distance.

The position information generation unit 102 also calculates, every time acceleration data is acquired from the acceleration data acquisition unit 107, a movement distance of the terminal apparatus 10 based on the acceleration data. The position information generation unit 102 periodically updates the distance information based on the generated distance information and the calculated movement distance.

The MFP determination unit 103 subjects the captured data to image recognition and determines a type of MFP 20 that is uniquely identified by the AR marker.

The print setting screen acquisition unit 104 acquires a print setting application of the relevant type of MFP 20 from the server apparatus 30 via the network N.

The print setting information generation unit 105 activates the print setting application, detects a user operation to the operation unit 15, and generates print setting information (color, paper size, number of copies, magnification, etc.) based on the detected result.

Based on the distance information and the print setting information, the user setting information generation unit 106 generates user setting information and transmits the information to the MFP 20.

The user setting information generation unit 106 also generates update distance information based on the updated distance information and periodically transmits the information to the MFP 20.

6. Functional Structure of MFP

Figure 5:
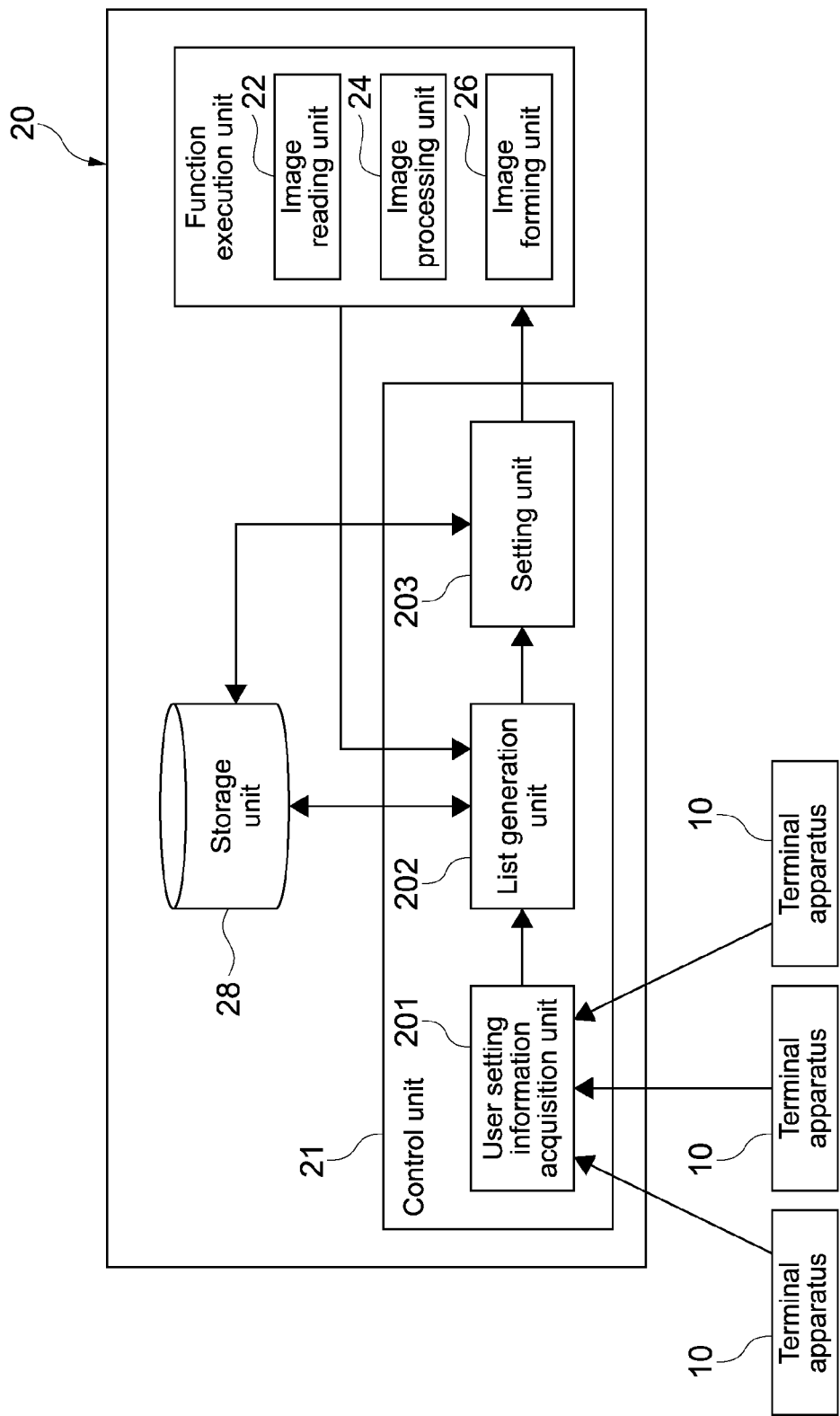
FIG. 5 shows a functional structure of the MFP.

FIG. 5 shows a functional structure of the MFP.

The control unit 21 of the MFP 20 loads a computer program stored in the ROM as an example of the non-transitory computer readable recording medium in the RAM and executes the computer program, to thus function as a user setting information acquisition unit 201, a list generation unit 202, and a setting unit 203.

The user setting information acquisition unit 201 acquires user setting information from one or more terminal apparatuses 10 and also periodically acquires update distance information.

The list generation unit 202 generates a print standby list based on the user setting information and the update distance information.

The setting unit 203 sets the print setting information registered at the top of the print standby list with respect to a function execution unit and displays it on the display unit 27a.

7. Operations of Information Processing System (7-1. Operations of Terminal Apparatus)

Figure 6:
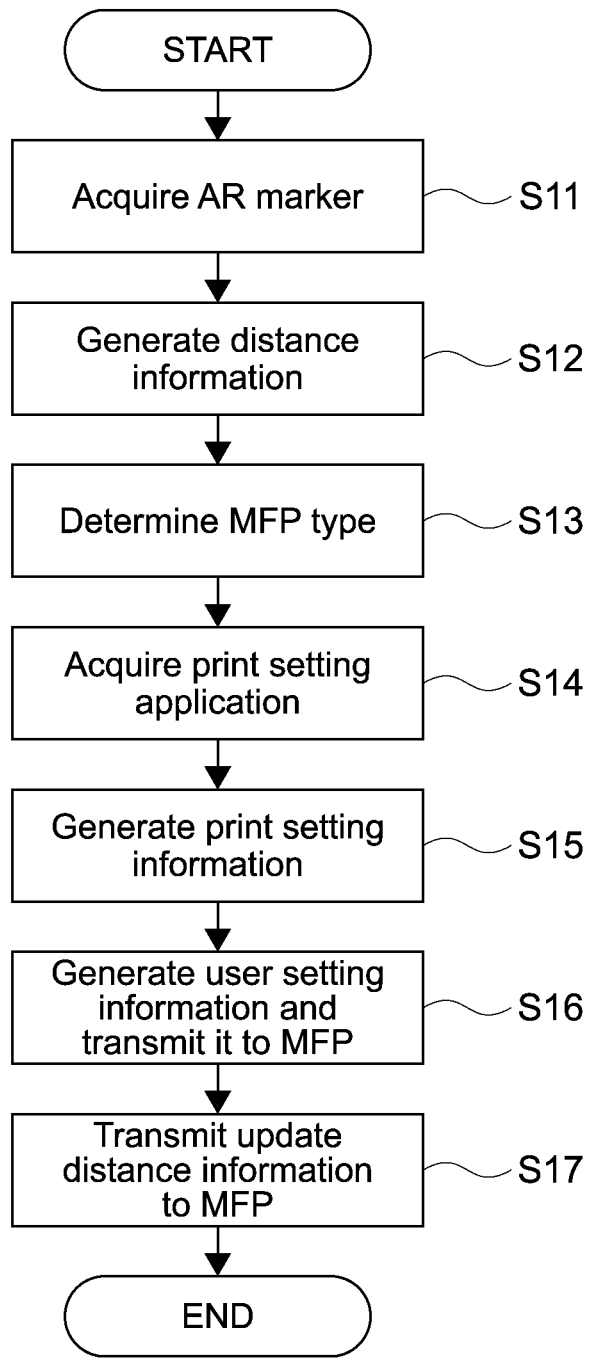
FIG. 6 shows operational steps of the terminal apparatus.

FIG. 6 shows operational steps of the terminal apparatus.

The camera 19 of the terminal apparatus 10 captures an AR marker attached to the MFP 20 to be used. The AR marker acquisition unit 101 acquires captured data of the AR marker captured by the camera 19 (Step S11). The AR marker acquisition unit 101 supplies the acquired captured data to the position information generation unit 102 and the MFP determination unit 103.

Upon acquiring the captured data from the AR marker acquisition unit 101, the position information generation unit 102 calculates a distance between the terminal apparatus 10 and the MFP 20 based on the size of the AR marker included in the captured data and generates distance information (position information) indicating the calculated distance (Step S12). The position information generation unit 102 supplies the generated distance information to the user setting information generation unit 106.

On the other hand, upon acquiring the captured data from the AR marker acquisition unit 101, the MFP determination unit 103 subjects the captured data to image recognition and determines a type of MFP 20 that is uniquely identified by the AR marker (Step S13). The MFP determination unit 103 notifies the print setting screen acquisition unit 104 of the determined type of MFP 20.

Upon being notified by the MFP determination unit 103, the print setting screen acquisition unit 104 acquires a print setting application of the MFP 20 of the notified type from the server apparatus 30 via the network N (Step S14). The print setting screen acquisition unit 104 supplies the acquired print setting application to the print setting information generation unit 105.

The "print setting application" is application software for generating print setting information (color, paper size, number of copies, magnification, etc.) of a specific type of MFP 20. Typically, the "print setting application" displays an image similar to a panel image of the MFP 20 on the display unit 12 of the terminal apparatus 10 and receives inputs of the print setting information via the operation unit 15 which is a touch sensor. As a result, a user can input the print setting information to the MFP 20 while operating the terminal apparatus 10 as if actually operating the touch panel of the MFP 20 to input the print setting information.

Upon acquiring the print setting application from the print setting screen acquisition unit 104, the print setting information generation unit 105 activates the print setting application. The print setting information generation unit 105 detects a user operation to the operation unit 15 and generates the print setting information (color, paper size, number of copies, magnification, etc.) based on the detected result (Step S15). The print setting information generation unit 105 supplies the generated print setting information to the user setting information generation unit 106.

Upon acquiring the distance information from the position information generation unit 102 (Step S12) and the print setting information from the print setting information generation unit 105 (Step S15), the user setting information generation unit 106 generates user setting information based on those information. The "user setting information" includes the distance information, the print setting information, and terminal information for uniquely specifying the terminal apparatus 10 (e.g., MAC (Media Access Control) address). The user setting information generation unit 106 transmits the generated user setting information to the MFP 20 by near field communication using Bluetooth® or the like (Step S16).

On the other hand, the acceleration sensor 14b detects accelerations of the terminal apparatus 10. The acceleration data acquisition unit 107 periodically acquires acceleration data detected by the acceleration sensor 14b and supplies the data to the position information generation unit 102.

Every time the acceleration data is acquired from the acceleration data acquisition unit 107, the position information generation unit 102 calculates the movement distance of the terminal apparatus 10 based on the acceleration data. The position information generation unit 102 periodically updates the distance information based on the generated distance information and the calculated movement distance. The position information generation unit 102 periodically supplies the updated distance information to the user setting information generation unit 106.

Every time the updated distance information is acquired from the position information generation unit 102, the user setting information generation unit 106 generates update distance information. The "update distance information" includes the distance information updated by the position information generation unit 102 and the terminal information. The user setting information generation unit 106 periodically transmits the update distance information to the MFP 20 (Step S17).

(7-2. Operations of MFP)

Figure 7:
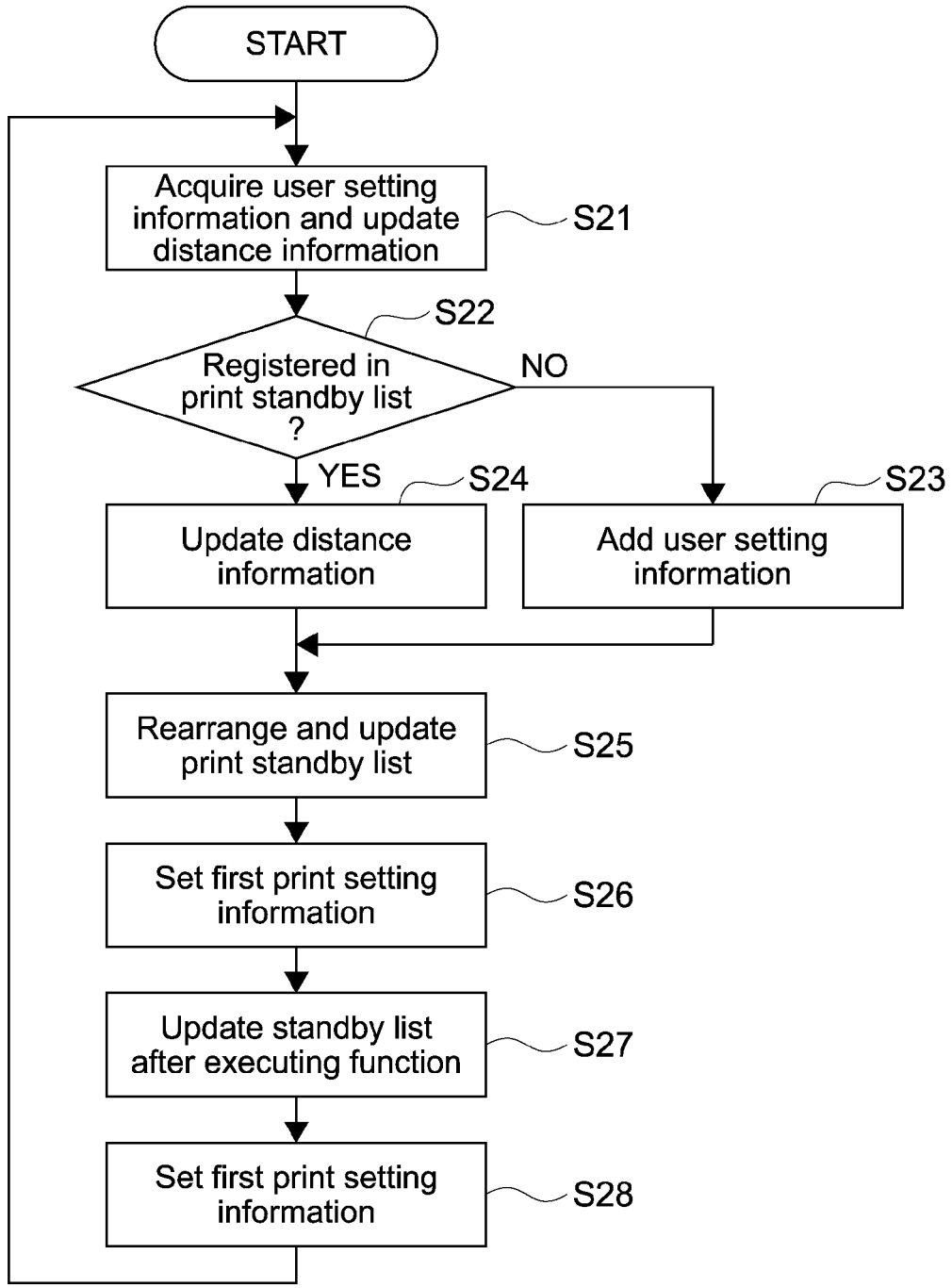
FIG. 7 shows operational steps of the MFP.

FIG. 7 shows operational steps of the MFP.

The user setting information acquisition unit 201 of the MFP 20 acquires the user setting information from the one or more terminal apparatuses 10 (Step S16) and also periodically acquires the update distance information (Step S17) (Step S21). Every time the user setting information and the update distance information are acquired, the user setting information acquisition unit 201 supplies the user setting information and the update distance information to the list generation unit 202. The list generation unit 202 generates a print standby list.

FIG. 8 schematically shows the print standby list.

The "print standby list" is a list in which the one or more terminal apparatuses 10 as supply sources of the user setting information acquired by the MFP 20 are arranged from the apparatus closest to the MFP 20. More specifically, one user setting information (terminal information, distance information, and print setting information) is registered for one terminal apparatus 10 in the "print standby list", and the pieces of user setting information are arranged from the terminal closest to the MFP 20.

Specifically, when the user setting information is acquired from the user setting information acquisition unit 201, the list generation unit 202 determines it as the user setting information acquired from a terminal apparatus 10 unregistered in the print standby list (NO in Step S22) and adds the user setting information to the print standby list (Step S23). Specifically, the list generation unit 202 newly adds the acquired user setting information at the bottom of the print standby list already stored in the storage unit 28. Alternatively, when nothing is registered in the print standby list, the list generation unit 202 generates a print standby list including only the acquired user setting information (Step S23). Accordingly, since the terminal apparatus 10 of the user newly standing in a standby line is added to the list in real time, convenience for users can be additionally improved.

On the other hand, upon acquiring the update distance information from the user setting information acquisition unit 201, the list generation unit 202 determines it as the update distance information acquired from the terminal apparatus 10 registered in the print standby list (YES in Step S22). The list generation unit 202 determines the user setting information including terminal information that is the same as that included in the acquired update distance information out of the one or more pieces of user setting information registered in the print standby list. The list generation unit 202 updates the distance information included in the user setting information determined as including the same terminal information by the distance information included in the acquired update distance information (Step S24). By rearranging the user setting information from the terminal apparatus closest to the MFP 20 based on the update distance information, the list generation unit 202 updates the print standby list (Step S25).

The setting unit 203 references the print standby list stored in the storage unit 28, sets the print setting information included in the user setting information registered at the top of the print standby list (i.e., acquired from terminal apparatus 10 closest to MFP 20) with respect to the function execution unit, and displays the print setting information on the display unit 27a (Step S26). The "function execution unit" includes the image reading unit 22, the image processing unit 24, the image forming unit 26, and the like and includes functions for executing printing.

Here, the print setting information generated by the terminal apparatus 10 closest to the MFP 20 is set in the function execution unit and displayed on the display unit 27a (Step S26). Specifically, the "terminal apparatus 10 closest to the MFP 20" is a terminal apparatus 10 possessed by a user closest to the MFP 20. In other words, when a plurality of users are waiting in the standby line of the MFP 20, the "terminal apparatus 10 closest to the MFP 20" is a terminal apparatus 10 possessed by the user at the head of the standby line. In short, the print setting information generated by the head user using his/her own terminal apparatus 10 is set in the function execution unit and displayed on the display unit 27a. Accordingly, the head user does not need to input the print setting information via the operation unit 27 of the MFP 20 and can execute the printing function by the MFP 20 as soon as his/her turn comes.

As the function execution unit executes the printing function for the number of copies (number of times) included in the print setting information, the list generation unit 202 deletes the user setting information including that print setting information from the print standby list to update the print standby list (Step S27). As a result, since the terminal apparatus 10 that has executed the function is deleted from the list, the setting information from such a terminal apparatus 10 does not need to be set in the MFP 20 anymore, and thus convenience for users using the MFP 20 after that can be additionally improved. Then, the list generation unit 202 supplies the print setting information included in the user setting information registered at the top of the updated print standby list to the setting unit 203. The setting unit 203 sets the print setting information as in Step S26.

It should be noted that there is a possibility that a user trying to input print setting information by operating the operation unit 27 of the MFP 20 as usual without using the terminal apparatus 10 (application non-user) may be in the standby line. In this case, when it comes to the application non-user's turn to print, the print setting information that another user waiting in the standby line has generated using the terminal apparatus 10 is set and displayed in the MFP 20. At this time, there is no problem in particular since the application non-user only needs to execute printing by inputting the print setting information by operating the operation unit 27 of the MFP 20 as usual. As the printing of the application non-user is ended, the MFP 20 only needs to reset and display the print setting information that has been set and displayed right before the printing of the application non-user.

8. Conclusion

According to this embodiment, it becomes possible for a plurality of users to generate setting information with respect to a single MFP 20 at the same time using the plurality of terminal apparatuses 10. Then, the setting information generated by the terminal apparatus 10 closest to the MFP 20 is set in the MFP 20. Specifically, the "terminal apparatus 10 closest to the MFP 20" is a terminal apparatus 10 possessed by a user closest to the MFP 20. In other words, when a plurality of users are waiting in the standby line of the MFP 20, the "terminal apparatus 10 closest to the MFP 20" is a terminal apparatus 10 possessed by the user at the head of the standby line. In short, the setting information generated by the head user using his/her own terminal apparatus 10 is set in the MFP 20. Accordingly, the head user does not need to input the setting information via the operation unit of the MFP 20 and can execute the function by the MFP 20 as soon as his/her turn comes. As a result, when the plurality of users use a single MFP 20, it becomes possible to cut standby times of the users and enhance convenience for the users. In addition, since the standby line is updated in real time based on the users' behaviors, convenience for the users can be additionally improved.

9. Modified Example

In this embodiment, as the printing function is executed for the number of copies (number of times) included in the print setting information, the list generation unit 202 deletes the user setting information including that print setting information from the standby list to update the standby list (Step S27). Alternatively, the list generation unit 202 may delete the terminal apparatus 10 whose distance from the MFP 20 has become equal to or larger than a threshold value (i.e., user possessing terminal apparatus 10 has moved out of standby line) from the standby list. This modified example is particularly effective in a case where the number of copies is not included in the print setting information.

In this embodiment, as the position information of the terminal apparatus 10, the terminal apparatus 10 captures the AR marker attached to the MFP 20, and the distance between the terminal apparatus 10 and the MFP 20 is determined based on the captured information. Moreover, the acceleration sensor 14b acquires acceleration information of the terminal apparatus 10, and the distance between the terminal apparatus 10 and the MFP 20 is updated based on the acceleration information. Alternatively, an absolute position obtained by the GPS sensor 14a may be used as the position information of the terminal apparatus 10.

In this embodiment, the terminal apparatus 10 generates the print setting information (color, paper size, number of copies, magnification, etc.) and transmits it in advance to the MFP 20 before executing the printing function. Depending on the MFP, a printable number of copies or printing function may be restricted for divisional management. When the printable number of copies or printing function of the print setting information transmitted from the terminal apparatus 10 is restricted, the user setting information acquisition unit 201 of the MFP 20 may notify the terminal apparatus 10 in advance (i.e., before its turn to print) that printing is unavailable. As a result, the user can recognize that printing is unavailable before his/her turn and take measures such as changing the print setting information.

In this embodiment, the MFP is taken as an example of the electronic apparatus. However, the electronic apparatus only needs to be an electronic apparatus that is assumed to be used after a plurality of users individually set different types of information. For example, the electronic apparatus may be a ticket-vending machine installed at a convenience store and the like, an ATM (Automatic Teller Machine) installed at a bank and the like, and the like.

For example, when the electronic apparatus is a ticket-vending machine, the present disclosure can be implemented as in the embodiment above by using purchase setting information (event name, seat type, and desired number of tickets to be purchased) in place of the print setting information. When the remaining number of tickets is smaller than the desired number of tickets to be purchased, a user information acquisition unit of the ticket-vending machine may notify the terminal apparatus 10 in advance (i.e., before its turn to purchase ticket) that purchase is unavailable.

Furthermore, when the electronic apparatus is an ATM, the present disclosure can be implemented as in the embodiment above by using deposit setting information (account number, deposit amount, withdrawal amount) in place of the print setting information. When the deposit balance is smaller than the withdrawal amount, a user information acquisition unit of the ATM may notify the terminal apparatus 10 in advance (i.e., before its turn to withdraw) that withdrawal of the deposit is unavailable.

It should be understood by those skilled in the art that various modifications, combinations, sub-combinations and alterations may occur depending on design requirements and other factors insofar as they are within the scope of the appended claims or the equivalents thereof.

The invention claimed is:
1. An information processing system, comprising:
an electronic apparatus; and
one or more terminal apparatuses,
each of the one or more terminal apparatuses including
a first memory that stores a first information processing program, and
a first processor that executes the first information processing program,
when the first processor executes the first information processing program, the first processor
capturing a marker attached to the electronic apparatus by a camera, and acquiring captured data,
calculating a distance between the terminal apparatus and the electronic apparatus based on the size of the marker included in the captured data, and generating position information indicating the calculated distance,
generating setting information of the electronic apparatus, and
transmitting the generated position information and the generated setting information to the electronic apparatus, and the electronic apparatus including
a second memory that stores a second information processing program, and
a second processor that executes the second information processing program,
when the second processor executes the second information processing program, the second processor
acquiring the setting information generated by the one or more terminal apparatuses with respect to the electronic apparatus,
periodically acquiring the position information of the one or more terminal apparatuses with respect to the electronic apparatus,
determining a terminal apparatus closest to the electronic apparatus out of the one or more terminal apparatuses,
setting, in the electronic apparatus, the setting information acquired from the terminal apparatus closest to the electronic apparatus, and
executing a function based on the set setting information.

2. The information processing system according to claim 1, further comprising:
a server apparatus,
when the first processor executes the first information processing program, the first processor further
subjecting the captured data to image recognition, and determining a type of the electronic apparatus uniquely identified by the marker,
acquiring a setting application of the electronic apparatus of the type from the server apparatus, and
activating the setting application, and generating the setting information based on a user operation.

3. The information processing system according to claim 1,
each of the one or more terminal apparatuses further including an acceleration sensor,
when the first processor executes the first information processing program, the first processor further
after transmitting the generated position information and the generated setting information to the electronic apparatus, updating the position information based on the generated position information and acceleration data detected by the acceleration sensor, and
transmitting the updated position information to the electronic apparatus.

4. The information processing system according to claim 1,
when the second processor executes the second information processing program, the second processor further
generating a list in which the one or more terminal apparatuses are arranged from the terminal apparatus closest to the electronic apparatus, and
updating the list every time the position information is acquired periodically.

5. The information processing system according to claim 4,
when the second processor executes the second information processing program, the second processor further
adding, upon acquiring setting information and position information from a new terminal apparatus not on the list, the new terminal apparatus to a bottom of the list.

6. The information processing system according to claim 5,
when the second processor executes the second information processing program, the second processor further
determining that a distance between the terminal apparatus on the list and the electronic apparatus has become equal to or larger than a threshold value, and
deleting the determined terminal apparatus from the list.

7. The information processing system according to claim 1,
when the second processor executes the second information processing program, the second processor further
executing a function based on the set setting information, and
deleting, upon executing the function based on the setting information, the terminal apparatus that has generated the setting information for the executed function from the list.

8. The information processing system according to claim 7, wherein
the setting information includes the number of times the function is to be executed,
when the second processor executes the second information processing program, the second processor further
deleting, upon executing the function the number of times included in the setting information, the terminal that has generated the setting information from the list.

* * * * *